(12) United States Patent
Yuan et al.

(10) Patent No.: US 10,313,115 B2
(45) Date of Patent: Jun. 4, 2019

(54) SYSTEM AND METHOD FOR QUANTUM KEY DISTRIBUTION

(71) Applicant: Alibaba Group Holding Limited, George Town, Grand Cayman (KY)

(72) Inventors: Peng Yuan, Hangzhou (CN); Zhiqiang Wang, Hangzhou (CN); Shuanlin Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 147 days.

(21) Appl. No.: 15/391,603

(22) Filed: Dec. 27, 2016

(65) Prior Publication Data

US 2017/0237558 A1    Aug. 17, 2017

(30) Foreign Application Priority Data

Feb. 15, 2016    (CN) .......................... 2016 1 0086638

(51) Int. Cl.
*H04L 9/08*    (2006.01)
*H04L 9/14*    (2006.01)

(52) U.S. Cl.
CPC .......... *H04L 9/0858* (2013.01); *H04L 9/0852* (2013.01); *H04L 9/0819* (2013.01); *H04L 9/0833* (2013.01); *H04L 9/14* (2013.01)

(58) Field of Classification Search
CPC ........ H04L 9/0852; H04L 9/0858; H04L 9/14
See application file for complete search history.

(56) References Cited

U.S. PATENT DOCUMENTS

| | | |
|---|---|---|
| 5,307,410 A | 4/1994 | Bennett |
| 5,675,648 A | 10/1997 | Townsend |
| 6,505,247 B1 | 1/2003 | Steger |

(Continued)

FOREIGN PATENT DOCUMENTS

| | | |
|---|---|---|
| EP | 0962070 | 12/1999 |
| WO | 2012098543 | 7/2012 |

(Continued)

OTHER PUBLICATIONS

Tien-Sheng Lin, et al., Quantulm Aulthentication and Secure Communication Protocols, 2006 IEEE (Year:2006).

(Continued)

*Primary Examiner* — Jung W Kim
*Assistant Examiner* — Carlos M De Jesus Lassala
(74) *Attorney, Agent, or Firm* — Shun Yao; Park, Vaughan, Fleming & Dowler LLP (57) ABSTRACT

One embodiment provides a system for facilitating distribution of quantum keys. During operation, the system receives, from a requester, a first request for a key, wherein the first request indicates a requested length for the key and identifying information of the requester. The system determines whether a subset pool of a general pool of keys is allocated to the requester based on the identifying information of the requester, wherein the keys in the general pool are generated by a quantum engine. In response to determining that a subset pool is not allocated to the requester, the system allocates a subset pool to the requester. The system obtains from the allocated subset pool a key with a length matching the requested length, and the system returns the obtained key to the requester.

20 Claims, 8 Drawing Sheets

(56) References Cited

U.S. PATENT DOCUMENTS

| | | |
|---|---|---|
| 9,077,577 B1 | 7/2015 | Ashrafi |
| 9,130,742 B2 * | 9/2015 | Yao ..................... H04L 9/0827 |
| 9,294,267 B2 | 3/2016 | Kamath |
| 9,323,901 B1 | 4/2016 | Nair |
| 9,887,976 B2 | 2/2018 | Hughes |
| 2005/0071677 A1 | 3/2005 | Khanna |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2007/0016794 A1 | 1/2007 | Harrison |
| 2007/0076889 A1 | 4/2007 | Derobertis et al. |
| 2007/0147292 A1 | 6/2007 | Van Ewijk |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball |
| 2008/0222734 A1 | 9/2008 | Redlich |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0204812 A1 | 8/2009 | Baker |
| 2009/0271634 A1 | 10/2009 | Boult |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2011/0069972 A1 | 3/2011 | Wiseman |
| 2011/0099367 A1 | 4/2011 | Thom |
| 2011/0209202 A1 | 8/2011 | Otranen |
| 2011/0213979 A1 | 9/2011 | Wiseman |
| 2011/0231615 A1 | 9/2011 | Ober |
| 2012/0045002 A1 | 2/2012 | Zivkovic |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1 | 4/2013 | Nordholt |
| 2013/0227286 A1 | 8/2013 | Brisson |
| 2013/0246641 A1 | 9/2013 | Vimpari |
| 2013/0251145 A1 | 9/2013 | Lowans |
| 2014/0141725 A1 | 5/2014 | Jesme |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 * | 11/2014 | Armstrong ............ H04L 9/0855 713/171 |
| 2014/0351915 A1 | 11/2014 | Otranen |
| 2015/0046709 A1 | 2/2015 | Anspach |
| 2015/0095987 A1 | 4/2015 | Potash |
| 2015/0181308 A1 | 6/2015 | Ducharme |
| 2015/0222619 A1 | 8/2015 | Hughes |
| 2015/0236852 A1 * | 8/2015 | Tanizawa ............ H04L 9/0858 380/278 |
| 2015/0288517 A1 | 10/2015 | Evans |
| 2015/0288542 A1 | 10/2015 | Ashrafi |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0021068 A1 | 1/2016 | Jueneman |
| 2016/0080708 A1 | 3/2016 | Urata |
| 2016/0105439 A1 | 4/2016 | Hunt |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0359839 A1 | 12/2016 | Natividad |
| 2017/0034167 A1 | 2/2017 | Figueira |
| 2017/0302448 A1 | 10/2017 | Luk |
| 2017/0324730 A1 | 11/2017 | Otranen |

FOREIGN PATENT DOCUMENTS

| | | | |
|---|---|---|---|
| WO | 2013026086 | 2/2013 | |
| WO | 2013026086 A1 | 2/2013 | |
| WO | WO 2013/026086 * | 2/2013 | ............ G06F 21/00 |
| WO | 2016070141 | 5/2016 | |

OTHER PUBLICATIONS

Charles H. Bennett et al., Quantum cryptography: Public key distribution and coin tossing, www.elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

SYSTEM AND METHOD FOR QUANTUM KEY DISTRIBUTION

RELATED APPLICATION

Under 35 U.S.C. 119, this application claims the benefit and right of priority of Chinese Patent Application No. 201610086638.0, filed 15 Feb. 2016.

BACKGROUND

Field

This disclosure is generally related to the field of quantum communication. More specifically, this disclosure is related to a system and method for quantum key distribution.

Related Art

The development of quantum mechanics has resulted in applications in many aspects of life. Quantum mechanics can be applied to cryptography, including quantum key distribution protocols like Bennett Brassard (BB84), Differential Phase-Shift (DPS), Coherent One-Way (COW), and SARG (derived from BB84). A quantum key distribution system typically includes three components: 1) a quantum engine for quantum-related functions, including generating keys and transmitted the generated keys to corresponding key management modules; 2) a key management module for managing keys received from the quantum engine, including storing a pool of keys; 3) and an application which requests keys from the key management module. The key pool managed by the key management module is a shared resource. As a result, when multiple applications concurrently request keys from the key management module, the key management module can only process the requests in serial. The key management module can only respond to one request at a time, and thus can only obtain one key at a time from the shared key pool.

Because the single shared key pool can become a bottleneck, the typical quantum key distribution system can result in congestion. As the number of requests increases, so does the average waiting time for an application to obtain a response to its request. This may result in a marked decrease in the quality of service of the quantum key distribution system.

SUMMARY

One embodiment of the present invention provides a system for facilitating quantum key distribution. During operation, the system receives, from a requester, a first request for a first key, wherein the first request indicates a requested length for the first key and identifying information of the requester. The system determines whether a subset pool of a general pool of keys is allocated to the requester based on the identifying information of the requester, wherein the keys in the general pool are generated by a quantum engine. In response to determining that a subset pool is not allocated to the requester, the system allocates a subset pool to the requester. The system obtains from the allocated subset pool a second key with a length matching the requested length, and returns the obtained second key to the requester.

In some embodiments, in response to determining that a subset pool is allocated to the requester based on the identifying information of the requester, and in response to determining that the second key does not exist in the allocated subset pool, the system applies from the general pool for a third key with a length greater than or equal to the requested length. The system obtains the third key and adds the third key to the allocated subset pool of the requester.

In some embodiments, allocating the subset pool to the requester further comprises: creating a plurality of subset pools as part of an initialization process; and selecting the subset pool from the plurality of subset pools.

In some embodiments, allocating the subset pool to the requester further comprises: applying from the general pool for a third key of the requested length or of a pre-determined length, wherein the requested length is less than or equal to the predetermined length; obtaining the third key; and constructing the subset pool using the third key.

In some embodiments, allocating the subset pool to the requester further comprises applying for the second key. In response to identifying the second key in a recycled key pool, the system obtains the second key from the recycled key pool. In response to not identifying the second key in the recycled key pool, the system applies from the general pool for the second key. In response to not obtaining the second key from the general pool, the system returns a failure message to the requester.

In some embodiments, in response to receiving a message from the requester to terminate a TCP connection or in response to determining that a second request from the requester for a third key is not received within a predetermined period of time, the system performs the following: in response to determining any remaining keys in the allocated subset pool, the system adds the remaining keys to a recycled key pool; and the system releases the allocated subset pool.

In some embodiments, the method is performed by a first module on a same or a different device as the requester. The requester is a first requester. The first module communicates with a second module on a second device, and the second module communicates with a second requester on a same or a different device as the second module, wherein a requester is an application. The general pool is a first general pool maintained by the first module, and the allocated subset pool is a first allocated subset pool maintained by the first module. A second general pool is maintained by the second module, and a second allocated subset pool is maintained by the second module. The system generates, by the first module, a synchronization message for the second module. The system receives, by the first module, an acknowledgment of the synchronization message from the second module.

In some embodiments, the system transmits, by the first requester to the second requester, a notification message which indicates parameters associated with the synchronization message, which causes the second requester to: transmit to the second module a second request for a third key, wherein the second request is based on the parameters indicated in the notification message; and receive a fourth key with a length matching the requested length, wherein the fourth key is obtained from the second allocated subset pool.

In some embodiments, the synchronization message indicates for the second module to perform one or more of: allocating the second subset pool to the second requester, wherein the second allocated subset pool includes keys which are the same as the keys in the first allocated subset pool; obtaining from the second allocated subset pool the fourth key; applying from the second general pool for a fifth key with a length greater than or equal to the requested length; in response to identifying the fourth key in a recycled key pool of the second module, obtaining the fourth key from the recycled key pool; in response to not identifying the fourth key in the recycled key pool, applying from the second general pool for the fourth key; releasing the second allocated subset pool; adding any remaining keys from the second allocated subset pool to the recycled key pool; and performing any method performed by the first module to provide a synchronization between the first module and the second module of the first general pool and the second general pool, the first allocated subset pool and the second allocated subset pool, and the obtained second key and the obtained fourth key.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of serial access to a shared pool of keys from concurrent key requests in a quantum distribution system by allocating dedicated subsets of the shared pool to requesters, which provides parallel access to the shared pool.

Because the single shared key pool can become a bottleneck, the typical quantum key distribution system can result in congestion. As the number of requests increases, so does the average waiting time for an application to obtain a response to its request. This may result in a marked decrease in the efficiency and quality of service of the quantum key distribution system.

Embodiments of the present invention address this inefficiency by providing parallel access to the keys in the shared key pool. The present system allocates a dedicated subset of the shared key pool to a requester, either upon initialization or dynamically in response to incoming requests.

The term "general pool" refers to a pool for storing keys to be distributed. The keys are generated and transferred by a quantum engine to a module that manages the general pool (e.g., a key management module). The term "subset pool" refers to a dedicated pool of keys which includes a subset of the keys in the general pool. A subset pool may be allocated to a requester based on methods as described below in relation to FIGS. 2B and 3.

A quantum key distribution system allows a first and a second requester to obtain the same key, where each requester sends a key request to its respective key management module. Typically the first requester is considered the active initiator, and the second requester is considered the passive initiator. The active initiator may use the obtained key to encrypt a subsequent message, while the passive initiator may use the obtained key to decrypt the encrypted message. Any entity can be an active initiator or a passive initiator. The key management procedure of an active initiator is described below in relation to FIGS. 2A, 2B, and 3. An exemplary communication depicting synchronization between an active initiator and a passive initiator is described below in relation to FIG. 5.

Thus, the present system provides improvements to quantum key distribution, where the improvements are fundamentally technological. Embodiments of the present invention provide a technological solution (e.g., providing parallel access to a shared pool of keys by allocating dedicated subsets of keys from the shared pool to specific requesters) to the technological problem of efficient, secure, and effective quantum key distribution.

Exemplary System

Figure 1:
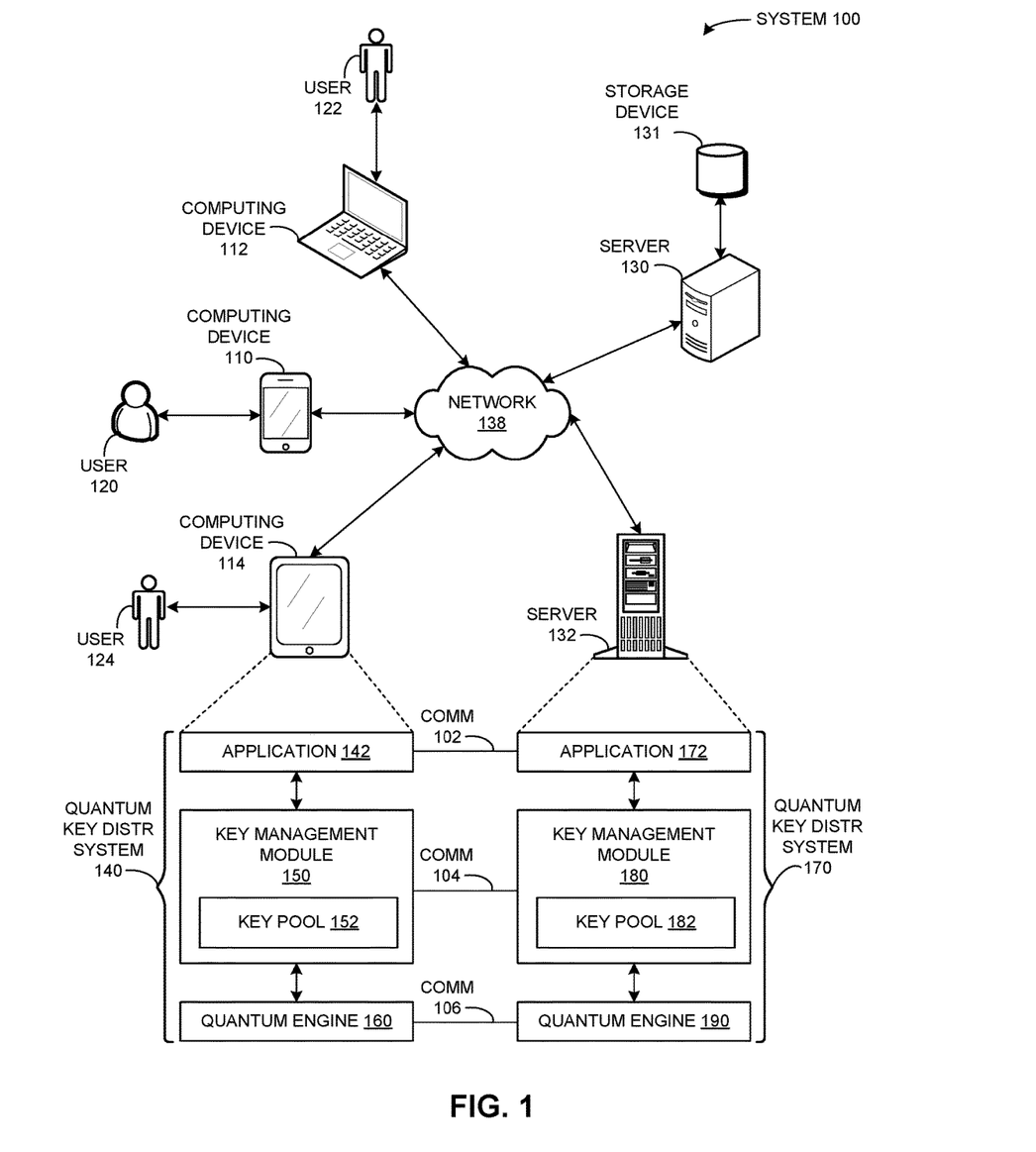
FIG. 1 illustrates an exemplary system that facilitates quantum key distribution, in accordance with an embodiment of the present application.

FIG. 1 illustrates an exemplary system that facilitates quantum key distribution, in accordance with an embodiment of the present application. System 100 can include computing devices 110, 112, and 114, which are associated with users 120, 122, and 124, respectively. Computing devices 110-114 can include, for example, a tablet, a mobile phone, an electronic reader, a laptop computer, a desktop computer, or any other computing device. Computing devices 110-114 can communicate with servers 130 and 132 via a network 138. Server 130 can communicate with a storage device 131. In some embodiments, storage device 131 resides on server 130. Servers 130 and 132 can also include any other computing device. Computing device 114 can include a quantum key distribution system 140, which can include: an application 142; a key management module 150 which includes a (shared) key pool 152; and a quantum engine 160. Application 142, key management module 150, and quantum engine 160 can reside on the same device (such as device 114 as depicted in FIG. 1) or on different devices (not depicted).

Similarly, server 132 can include a quantum key distribution system 170, which can include: an application 172; a key management module 180 which includes a (shared) key pool 182; and a quantum engine 190. Application 172, key management module 180, and quantum engine 190 can reside on the same device (such as server 132 as depicted in FIG. 1) or on different devices (not depicted).

Applications 142 and 172 can communicate via a communication link 102. Key management modules 150 and 160 can communicate via a communication link 104. Quantum engines 160 and 190 can communicate via a communication link 106, which can be a quantum or photonic communication.

In a key request communication, module 150 can be an active initiator and module 180 can be a passive initiator. During operation, quantum engines 160 and 190 can negotiate and generate a set of keys, which are transmitted to and stored by, respectively, modules 150 and 180. Subsequently, application 142 can send a request to module 150 for a key of a specific length. Module 150 can obtain a key (or key sequence) matching the specific length from a subset pool allocated to the requester, as described below in relation to FIG. 2A. Module 150 can also determine whether a subset pool has been allocated to the requester, and if not, allocate a subset pool to the requester, as described below in relation to FIG. 2A. Module 150 can return the obtained key to application 142. Modules 150 and 180 can perform synchronization procedures, so that a subsequent request from application 172 can return the same obtained key, as described below in relation to FIG. 5. This allows device 114 and server 132 to use the obtained key to encrypt and decrypt subsequent communications.

Implementation of Subset Pools

The key management module can construct the subset pool in various ways. For example, the key management module may apply from the general pool for a key of a predetermined length, and part of the general pool that stores the key may be directly separated from the general pool to serve as the subset pool. Alternatively, the key management module may apply for additional memory based on the predetermined length to serve as the subset pool, such that the key management module may apply from the general pool for a key of a predetermined length, where the key may be copied into the subset pool.

Note that the requester may send multiple key requests over a certain period of time. This period of time can be referred to as the "key acquisition period." When the key management module receives a key request and determines that a subset pool has not yet been allocated to the requester, the key management module can determine that the requester is a new requester is at the start of a key acquisition period.

The subset pool may use a key bit as a basic unit, i.e., the subset pool can store an unstructured key bit stream. The subset pool may be implemented using a data structure of, e.g., a bit array or a queue. In the example of the bit array, the obtained key of the subset pool can be stored in the bit array where each member in the array stores a key bit of the key. In some embodiments, a requester may use a relatively fixed encryption and decryption algorithm, such that the key requests are for keys of a fixed length. That is, key requests from a requester during a key acquisition period may indicate keys of the same length, where the requested length is equal to the fixed length. Thus, the subset pool may also use a key block as a basic unit, where the length of a key contained in each key block is the same as the fixed length. This allows a key block to be directly obtained from the general pool each time a key is returned to the requester, which can improve the processing efficiency. For example, the key management module may apply from the general pool for a key of the fixed length, and the applied-for key may be segmented into key blocks of a corresponding length based on the fixed length. The key management module may then construct the subset pool using the segmented key blocks as basic units.

As discussed above, the subset pool may be implemented using a data structure such as a queue. In the example of the queue, the segmented data blocks may be added into the queue, i.e., each unit in the queue is a key block, and the subset pool is accessed through a read pointer and a write pointer of the queue. When the key management module obtains a key from the subset pool, a key block pointed to by the read pointer is directly returned. If a key block needs to be added into the subset pool, the key block is directly added into a unit pointed to by the write pointer.

Method for Facilitating Quantum Key Distribution (Active Initiator)

Figure 2A:
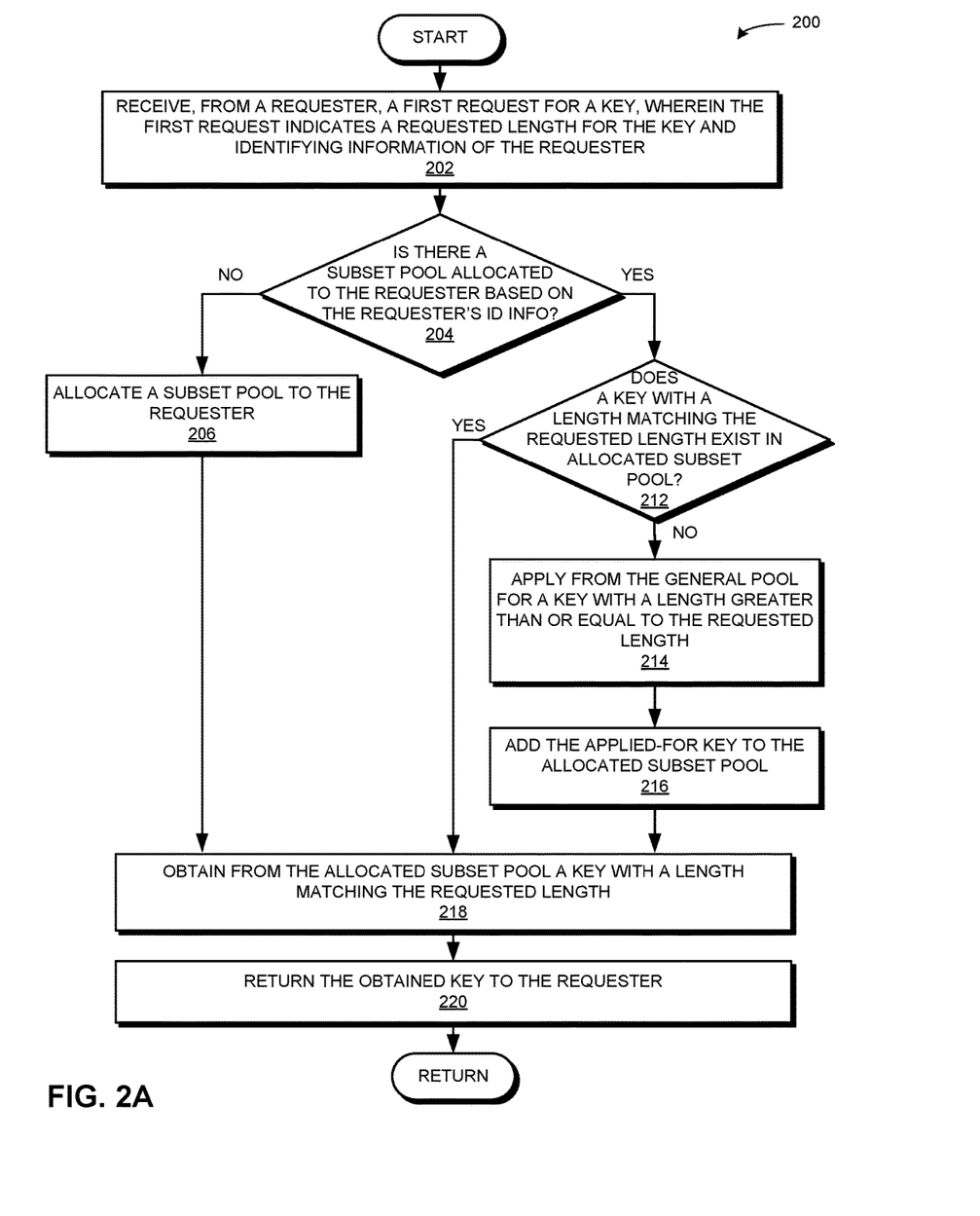
FIG. 2A presents a flowchart illustrating a method by a key management module for facilitating quantum key distribution, in accordance with an embodiment of the present application.

FIG. 2A presents a flowchart 200 illustrating a method by a key management module for facilitating quantum key distribution, in accordance with an embodiment of the present application. The key management module may be a host procedure running on a local device. During operation, the system receives, by a key management module from a requester or requesting device, a first request for a key, wherein the first request indicates a requested length for the key and identifying information of the requester (operation 202). The requester and the key management module can be entities that run on the same device or on different devices. If the requester and the key management module run on the same device, the entities may interface via an inter-process communication (IPC) mechanism. For example, the requester may send a message, and the key management module may receive and parse the message. If the requester and the key management module run on different devices, the entities may interact via a network connection. For example, the requester may establish a TCP data connection to the key management module, and send the first request as an HTTP packet to the key management module via the TCP connection, and the key management module may receive the HTTP packet via the TCP connection.

The key management module determines whether there is a subset pool allocated to the requester based on the requester's identifying information (decision 204). If there is no subset pool allocated to the requester (indicating that the first request is from a new requester and that the key management module has not yet allocated a subset pool to the requester), the key management module allocates a subset pool to the requester (operation 206), as described below in relation to FIG. 2B.

If there is a subset pool allocated to the requester (indicating that the first request is not from a new requester and that the key management module has already allocated a subset pool to the requester), the key management module determines whether a key with a length matching the requested length exists in the allocated subset pool (decision 212). As an example, if the subset pool is implemented using a bit array, the key management module can—upon obtaining a key from the subset pool—update a subscript value of a first key bit to be distributed and record the length of the key bits to be distributed. Thus, the key management module can determine whether a key of the matching length exists in the allocated subset pool based on the information related to the bit array.

Furthermore, if the subset pool is implemented using a key block as a basic unit, the key management module can determine whether a key block containing a key of the fixed length exists in the allocated subset pool. As another example, if the subset pool is implemented using a queue, the key management module can determine whether there is any distributable key block based on a positional relationship between read and write pointers. If there is no distributable key block (i.e., the queue is empty), the key management module can determine that a key with a length matching the requested length does not exist in the allocated subset pool. Also, if the queue is not empty but has only one incomplete key block containing a key whose length is less than the fixed length, the key management module can determine that a key with a length matching the requested length does not exist in the allocated subset pool. An incomplete key block can be, e.g., a fragment caused by the fact that the preset length is not an integer multiple of the fixed length.

If a key with the matching length exists in the allocated subset pool, the operation continues at operation 218. If a key with the matching length does not exist in the allocated subset pool, the key management module applies from the general pool for a key with a length greater than or equal to the requested length (operation 214). The key management module can also apply for a key with a length of a predetermined length which is greater than or equal to the requested length. The key management module adds the applied-for key to the allocated subset pool (operation 216). The key management module obtains from the allocated subset pool a key with a length matching the requested length (operation 218), and returns the obtained key to the requester (operation 220). The key management module may return the obtained key to the requester via an IPC (if the requester is on the same device as the key management module) or via a network transmission such as TCP (if the requester is on a different device than the key management module).

If the subset pool is implemented using a bit array, each key bit in a key applied for from the general pool may be stored in each member of the array. As a result, the key management module can update a subscript value of a first key bit to be distributed, and record the length of the distributable key bits. If the subset pool is implemented using a key block as a basic unit, the key management module may segment the applied-for key into key blocks of a corresponding length based on the fixed length, and add the segmented key blocks into the subset pool. If the subset pool is implemented using a queue, the key management module may sequentially add the segmented key blocks into the queue based on a write pointer, which may be accordingly updated.

If the subset pool is implemented using a key bit stream, the key of the requested length may be intercepted from a key bit stream to be distributed. If the subset pool is implemented using a bit array, key bits stored in corresponding array members may be sequentially read based on the requested length, beginning from a subscript value of a first key bit to be distributed. The key bits may be combined into the key. Subsequently, the subscript value of the first key bit to be distributed and the length of distributable key bits may be accordingly updated.

If the subset pool is implemented using a key block as a basic unit, a key block may be directly obtained from the allocated subset pool, and a key contained in the key block may be used as the key to be returned to the requester. If the subset pool is implemented using a queue, a key in a key block pointed to by a read pointer may be read as a key sequence to be returned, and then the read pointer may be made to point to a next key block in the queue to prepare for a subsequent reading of the key block. When the subset pool is implemented using a key block as a basic unit (i.e., structured storage), a key block can be directly read as a unit without the need to ready key bits one at a time while obtaining the key. As a result, the processing efficiency of the key distribution system can improve.

Allocation of Subset Pools to Requester: Upon Initialization and Dynamically

Figure 2B:
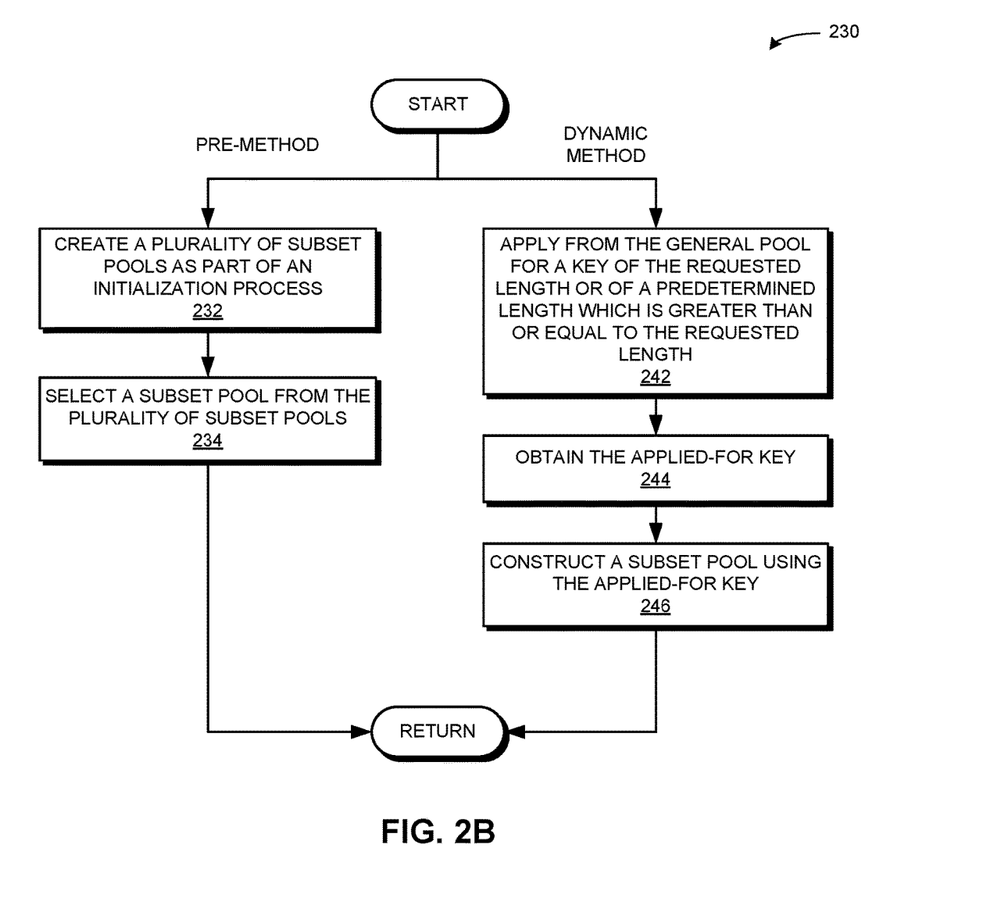
FIG. 2B presents a flowchart illustrating a method by a key management module for allocating a subset pool to a requester, in accordance with an embodiment of the present application.

FIG. 2B presents a flowchart 230 illustrating a method by a key management module for allocating a subset pool to a requester, in accordance with an embodiment of the present application. During operation, the key management module can allocate a subset pool to a requester by allocating subset pools upon startup (e.g., a "pre-method" or as part of an initialization process) or based on a dynamic method (e.g., in response to incoming requests). During startup, the key management module can create a plurality of subset pools as part of an initialization process (operation 232). A created subset pool can contain keys of a specific or predetermined length. The key management module can set a state of these pools to "Allocated." The key management module can select a subset pool from the plurality of subset pools (operation 234). The key management module can establish a correspondence or association between the requester's identifying information and the selected subset pool.

The key management module can also dynamically allocate a subset pool to a requester. The key management module can apply from the general pool for a key of the requested length or of a predetermined length which is greater than or equal to the requested length (operation 242). The key management module can obtain the applied-for key (operation 244), and construct a subset pool using the applied-for key (operation 246). The key management module can construct the subset pool by applying for a large block of keys, where the length of a key is greater than the requested length. This allows the key management module to prepare for both this request and subsequent requests. Subset pools may be constructed or implemented as described above.

Recycled Key Pools

Figure 3:
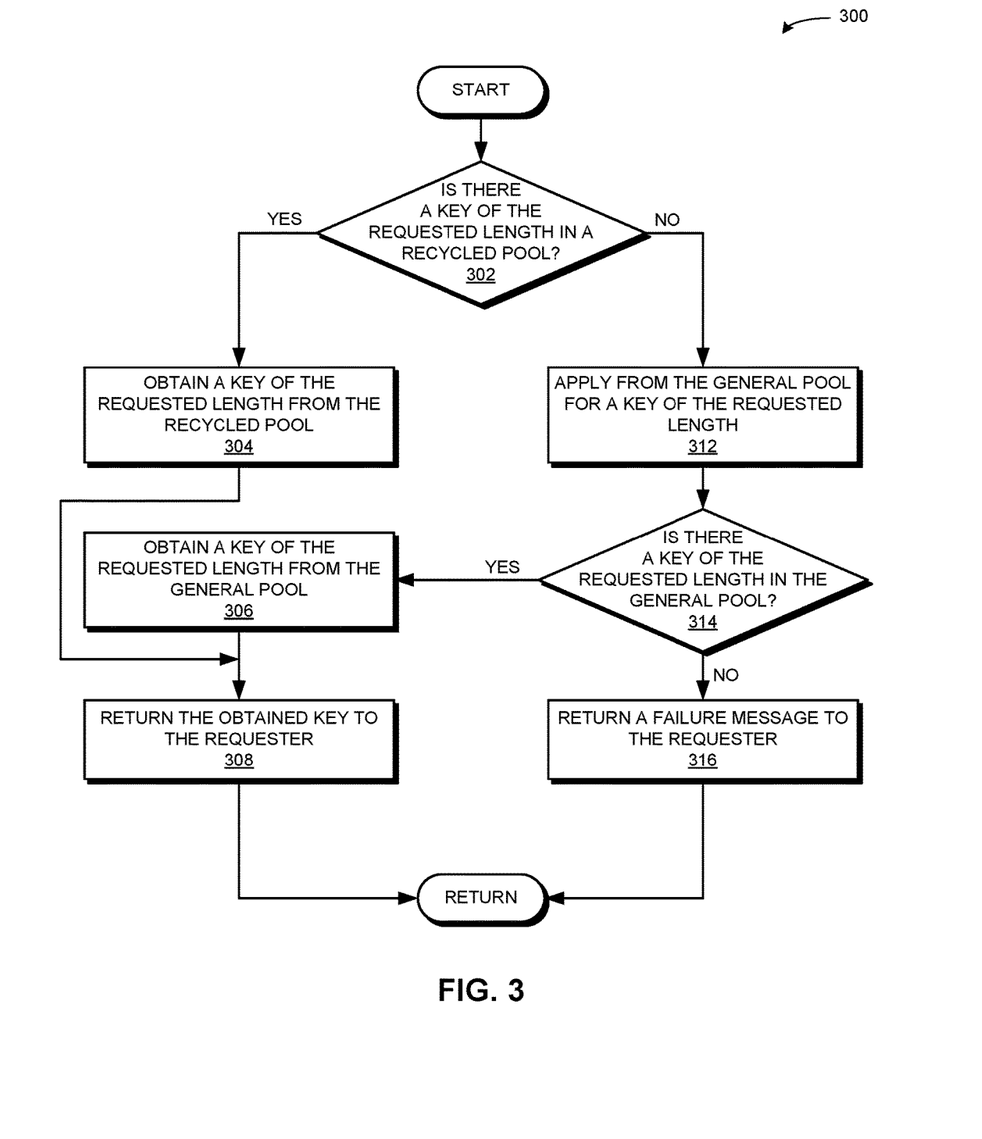
FIG. 3 presents a flowchart illustrating a method for applying for a key from a pool of keys, in accordance with an embodiment of the present application.

FIG. 3 presents a flowchart 300 illustrating a method for applying for a key from a pool of keys, in accordance with an embodiment of the present application. During operation, the key management module determines whether there is a key of the requested length in a recycled pool (decision 302). The key management module may have previously applied for memory to be allocated to a pool of recycled keys ("recycled pool"), such that keys which have been used and subsequently released may be added to the recycled pool to maximize and increase storage efficiency. If there is a key of the requested length in the recycled pool, the key management module obtains a key of the requested length from the recycled pool (operation 304). The key management module returns the obtained key to the requester (operation 308).

If there is not a key of the requested length in the recycled pool, the key management module applies from the general pool for a key of the requested length (operation 312). The key management module determines whether there is a key of the requested length in the general pool (decision 314). If there is, the key management module obtains a key of the requested length from the general pool (operation 306), and the key management module returns the obtained key to the requester (operation 308). If there is not a key of the requested length in the general pool, the key management module returns a failure message to the requester (operation 316).

Releasing an Allocated Subset Pool

Figure 4:
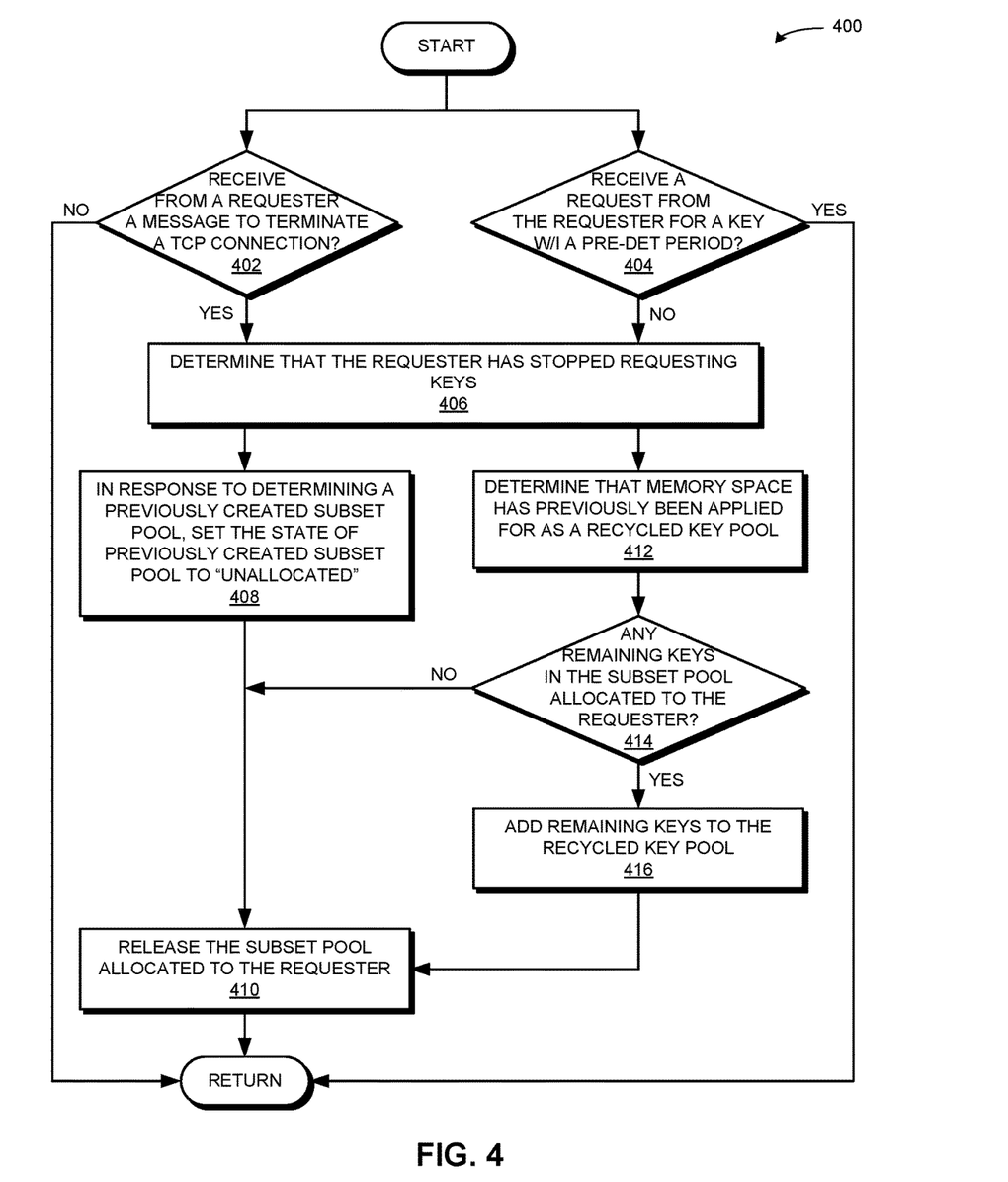
FIG. 4 presents a flowchart illustrating a method for releasing an allocated subset pool, in accordance with an embodiment of the present application.

FIG. 4 presents a flowchart 400 illustrating a method for releasing an allocated subset pool, in accordance with an embodiment of the present application. To ensure stable operation, the quantum key distribution system may include a post-processing operation to release an allocated subset pool. The system can determine that a requester has stopped requesting keys in various ways. When the requester and the key management module run on different devices, the key management module can determine whether it receives from the requester a message to terminate a TCP connection (decision 402). If the key management module does not receive such a message, the operation returns. If the key management module does receive such a message, the key management module can determine that the requester has stopped requesting keys (operation 406). When the requester and the key management module run on the same device, the key management module can determine whether it receives a request for a key from the requester within a predetermined period of time (decision 404). If it does, the operation returns. If it does not, the key management module can determine that the requester has stopped requesting keys (operation 406). In some embodiments, the system may set a timer for the subset pool based on the predetermined time period. The system may reset the timer upon receiving another key request from the requester. Thus, if the timer times out, the system can determine that the requester has stopped requesting keys.

In response to determining a previously created subset pool, the key management module can set the state of the previously created subset pool to "Unallocated" (operation 408), which allows the key management module to both fill the subset pool with keys to be distributed and allocate the subset pool to another requester. The key management module releases the subset pool allocated to the requester (operation 410). If additional memory space is allocated during the subset pool allocation, the memory space used by the subset pool may be released, which can reduce memory usage and avoid memory overflow. If the subset pool is a partial key pool separated from the general pool, the subset pool may be returned to the general pool for unified management. As a result, the general pool can maintain a relatively balanced size, instead of shrinking and failing to provide services externally.

The key management module can determine that memory space has previously been applied for as a recycled key pool during startup or initialization (operation 412). The key management module determines whether there are any remaining keys in the subset pool allocated to the requester (decision 414). If there are none, the key management module can release the subset pool allocated to the requester (operation 410). If there are remaining key in the allocated subset pool, the key management module can add the remaining keys to the recycled key pool (operation 416), and then release the allocated subset pool (operation 410).

If the subset pool is implemented using a bit array, a key bit stored in each array member may be sequentially read based on the recorded length of distributable key bits beginning from a subscript value of a first key bit to be distributed, which obtains the remaining key sequences to be added into the recycled key pool. If the subset pool is implemented using a key block as a basic unit, keys contains in the remaining key blocks may be added into the recycled key pool. If the subset pool is implemented using a queue, keys in key blocks between a read pointer and a write pointer may be sequentially read and then added into the recycled key pool.

Thus, for each subset pool allocated to a requester, when the key management module determines that the requester has stopped requesting keys, the key management module can add any remaining keys in the allocated subset pool to the recycled key pool. Subsequently, the key management module can apply to the recycled key pool first to obtain a key. As a result, idle key resources may still be effectively utilized.

Synchronization

Recall that in a quantum key distribution system, a first and a second requester may obtain the same key, where each requester sends a key request to its respective key management module. Typically the first requester is considered the active initiator, and the second requester is considered the passive initiator. The active initiator may use the obtained key to encrypt a subsequent message, while the passive initiator may use the obtained key to decrypt the encrypted message. Any entity can be an active initiator or a passive initiator. In order for each requester to obtain the same key, certain synchronization operations may be performed between the key management modules for each requester.

Figure 5:
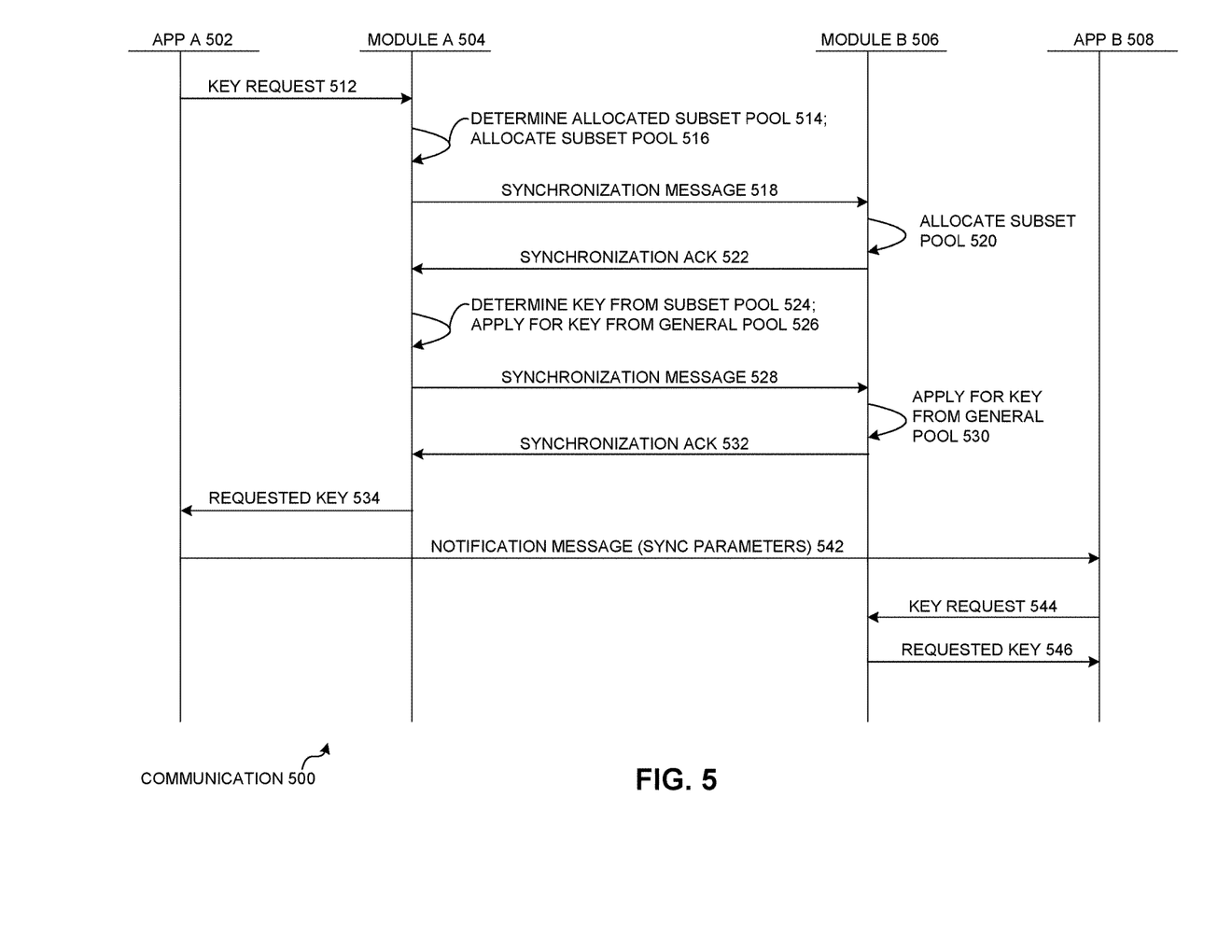
FIG. 5 presents an exemplary communication between two applications and two key management modules for facilitating synchronization of allocated subset pools and requested keys, in accordance with an embodiment of the present application.

Embodiments of the present invention include synchronization between the general pools managed by each key management module. FIG. 5 presents an exemplary communication 500 between two applications and two key management modules for facilitating synchronization of allocated subset pools and requested keys, in accordance with an embodiment of the present application. In communication 500, an Application ("App") A 502 can interact with an associated key management module ("Module") A 504. Module A can perform synchronization operations with a key management module ("Module") B 506, which is associated with an application ("App") B 508. In communication 500, App A is depicted as the active initiator, and App B is depicted as the passive initiator. Furthermore, Module A and Module B may communicate in advance via a quantum or photonic communication, such that each module includes the same set of keys that may be used as a general pool for subsequent quantum key distribution.

During operation, App A can send a key request 512 to Module A. Key request A can be, e.g., the first request as described in operation 202 of FIG. 2A. Module A can determine whether an allocated subset pool exists for the requester (i.e., App A) (function 514). If an allocated subset pool does not exist for the requester (i.e., App A), Module A can allocate a subset pool to the requester (function 516), similar to operation 206 of FIG. 2A. Module A can subsequently send a synchronization message 518 to Module B. Upon receiving message 518, Module B can perform a similar operation to allocate a subset pool to a requester (function 520). Message 518 can include information related to App A, which allows subsequent requesters (e.g., App B) to know that the subset pool allocated by Module B in function 520 corresponds to App A. Module B can then send a synchronization acknowledgment 522 back to Module A. Note that if an allocated subset pool does exists for App A (as determined by function 514), communication 500 can continue directly at function 524.

Module A can then determine a key from the allocated subset pool (function 524). If a key cannot be determined from the allocated subset pool, Module A can apply for a key from the general pool (function 526), similar to operations 214, 216, and 218 of FIG. 2A. Module A can subsequently send a synchronization message 528 to Module B. Upon receiving message 528, Module B can perform a similar operation to apply for a key from the general pool (function 530). Message 528 can include information related to App A, which allows subsequent requesters (e.g., App B) to know that key applied for by Module 506 in function 530 corresponds to App A. Module B can then send a synchronization acknowledgment 532 back to Module A. Note that if a key can be determined from the allocated subset pool, communication 500 can continue directly at function 534.

Subsequently, Module A can return the obtained and requested key 534 to App A. App A can send a notification message 542 to App B. Message 542 can include parameters for synchronization, i.e., which allow App B to know what information to include in a subsequent request for a key from Module B. Upon receiving message 542, App B can send a key request 544 to Module B. Key request 544 can be similar to key request 512, and can further indicate any relevant synchronization parameters, such as identifying information of App A or an allocated subpool for App A. Module B can receive key request 544 and any relevant synchronization parameters, and can return a requested key 546, which is the same as requested key 534. In this manner, App A and App B (via the synchronization functions performed respectively by Module A and Module B) can obtain the same key, and can use the same key to encrypt and decrypt subsequent communications.

Other methods for synchronization include splitting or combining the aforementioned operations. For example, Module A may perform a synchronization operation with Module B only when obtaining a key from the subset pool, where Module A notifies Module B of allocating the subset pool and selecting the key in a single operation. Module A may also perform synchronization operations with Module B in the following instances: applying for a key from the general pool; adding a key to a subset pool; releasing an allocated subset pool; and adding remaining key sequences to a recycled key pool. These operations ensure that the key pools of both parties (including the general pool, the allocated subset pools, and the recycled key pool) remain synchronized.

Exemplary Computer System and Device

Figure 6:
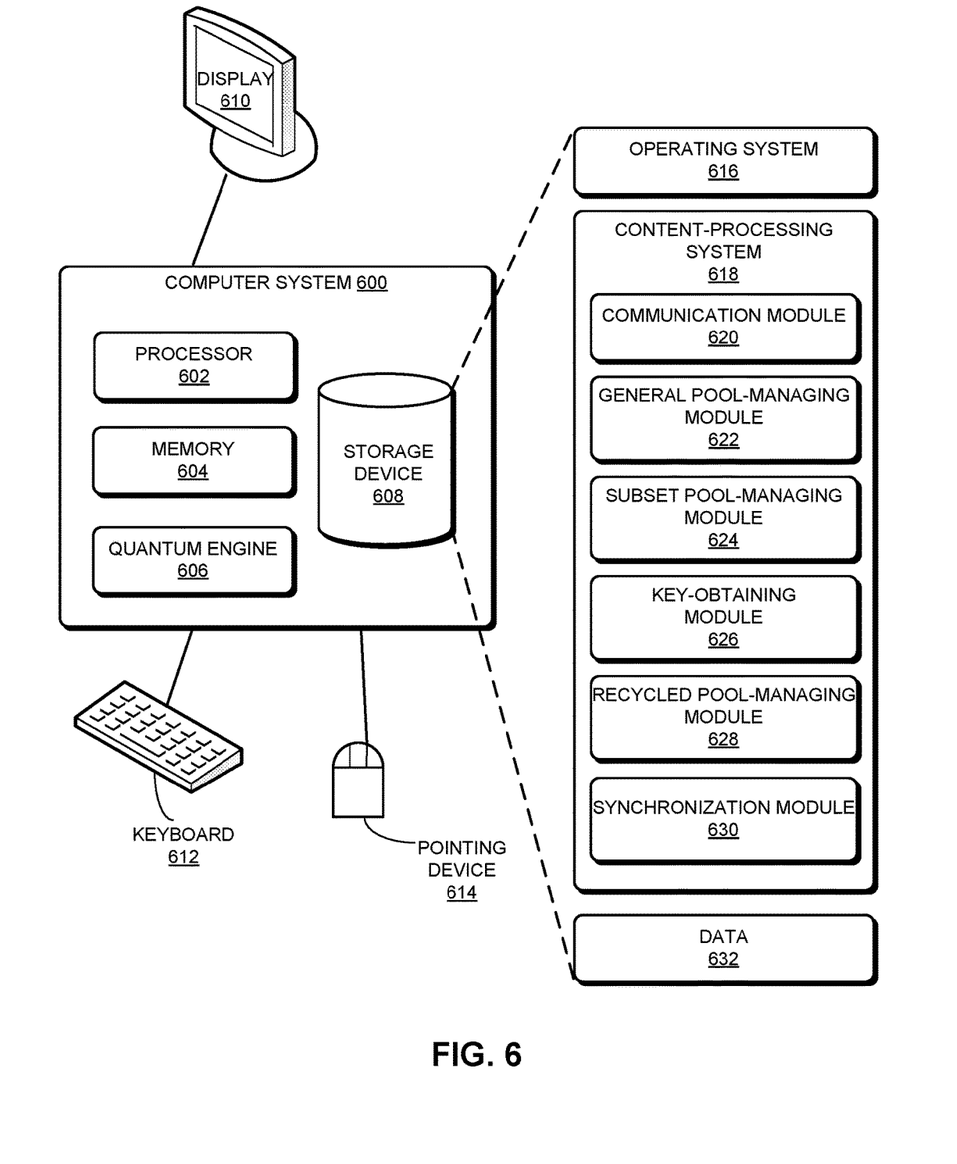
FIG. 6 illustrates an exemplary computer system that facilitates quantum key distribution, in accordance with an embodiment of the present application.

FIG. 6 illustrates an exemplary computer system 600 that facilitates quantum key distribution, in accordance with an embodiment of the present application. Computer system 600 includes a processor 602, a memory 604, a quantum engine 606, and a storage device 608. Memory 604 can include a volatile memory (e.g., RAM) that serves as a managed memory, and can be used to store one or more memory pools. Furthermore, computer system 600 can be coupled to a display device 610, a keyboard 612, and a pointing device 614. Quantum engine 606 can generate quantum keys and communicate via a quantum or photonic communication with another system by distributing and maintaining a same pool of keys. Storage device 608 can store an operating system 616, a content-processing system 618, and data 632.

Content-processing system 618 can include instructions, which when executed by computer system 600, can cause computer system 600 to perform methods and/or processes described in this disclosure. Specifically, content-processing system 618 can include: a communication module 620 for transmitting and receiving keys via a quantum or photonic communication, and for sending and receiving key requests and keys; a general pool-managing module 622 for maintaining and processing key requests or applications for key requests; a subset pool-managing module 624 for determining allocated subset pools, allocating subset pools, and processing key requests or applications for key requests; a key-obtaining module 626 for obtaining a key from an allocated subset pool; a recycled pool-managing module 628 for maintaining and processing key requests or applications for key requests; and a synchronization module 630 for performing synchronization operations such as generating, processing, transmitting, and receiving synchronization messages and other related notifications or messages.

Data 632 can include any data that is required as input or that is generated as output by the methods and/or processes described in this disclosure. Specifically, data 932 can store at least: a request for a key; identifying information of a requester; a key; a pool of keys; an allocated subset pool of keys; a recycled key pool; an indicator of a predetermined length; keys of the predetermined length; an indicator of a TCP connection; a message; a message to terminate a TCP connection; a predetermined period of time; a set of remaining keys; a synchronization message; an acknowledgment of a synchronization message; a notification message; and synchronization parameters.

Figure 7:
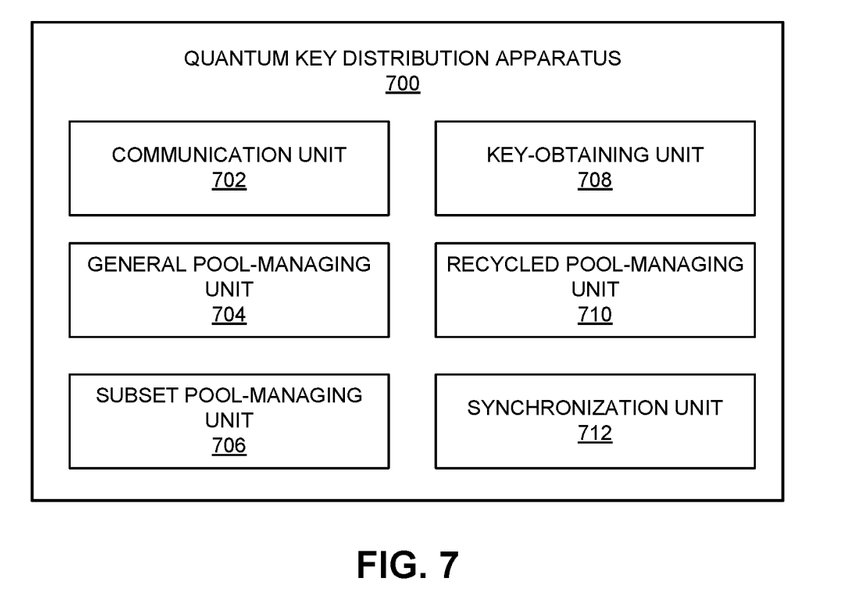
FIG. 7 illustrates an exemplary apparatus that facilitates quantum key distribution, in accordance with an embodiment of the present application.

FIG. 7 illustrates an exemplary apparatus 700 that facilitates quantum key distribution, in accordance with an embodiment of the present application. Apparatus 700 can comprise a plurality of units or apparatuses which may communicate with one another via a wired, wireless, quantum light, or electrical communication channel. Device 700 may be realized using one or more integrated circuits, and may include fewer or more units or apparatuses than those shown in FIG. 7. Further, device 700 may be integrated in a computer system, or realized as a separate device which is capable of communicating with other computer systems and/or devices. Specifically, device 700 can comprise units 702-712 which perform functions or operations similar to modules 620-630 of computer system 600 of FIG. 6, including: a communication unit 700; a general pool-managing unit 704; a subset pool-managing unit 706; a key-obtaining unit 708; a recycled pool-managing unit 710; and a synchronization unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating quantum key distribution, the method comprising:

receiving, from a requester, a first request for a first key, wherein the first request indicates a requested length for the first key and identifying information of the requester;

in response to determining that a subset pool of a general pool of keys has been previously allocated to the requester based on the identifying information of the requester, wherein the keys in the general pool are generated by a quantum engine, and wherein the allocated subset pool is dedicated to the requester and is a pool of keys which includes a subset of keys in the general pool of keys:

obtaining from the previously allocated subset pool a second key with a length matching the requested length; and returning, as the requested first key, the obtained second key to the requester; and in response to determining that a subset pool has not been previously allocated to the requester:

allocating a new subset pool to the requester, wherein the newly allocated subset pool is dedicated to the requester and is a pool of keys which includes a subset of keys in the general pool of keys;

establishing a correspondence between the identifying information of the requester and the newly allocated subset pool;

obtaining from the newly allocated subset pool a second key with a length matching the requested length; and returning, as the requested first key, the obtained second key to the requester.

2. The method of claim 1, wherein in response to determining that a subset pool has been previously allocated to the requester based on the identifying information of the requester, the method further comprises:

in response to determining that the second key does not exist in the previously allocated subset pool:

applying from the general pool for a third key with a length greater than or equal to the requested length;

obtaining the third key; and adding the third key to the previously allocated subset pool of the requester.

3. The method of claim 1, wherein allocating the new subset pool to the requester further comprises:

creating a plurality of subset pools as part of an initialization process; and selecting the new subset pool from the plurality of subset pools.

4. The method of claim 1, wherein allocating the new subset pool to the requester further comprises:

applying from the general pool for a third key of the requested length or of a pre-determined length, wherein the requested length is less than or equal to the predetermined length;

obtaining the third key; and constructing the new subset pool using the third key.

5. The method of claim 1, wherein allocating the new subset pool to the requester further comprises applying for the second key, which involves:

in response to identifying the second key in a recycled key pool, obtaining the second key from the recycled key pool;

in response to not identifying the second key in the recycled key pool, applying from the general pool for the second key; and in response to not obtaining the second key from the general pool, returning a failure message to the requester.

6. The method of claim 1, further comprising:

in response to receiving a message from the requester to terminate a TCP connection and in response to determining any remaining keys in the allocated subset pool:

adding the remaining keys to a recycled key pool; and releasing the allocated subset pool; and in response to determining that a second request from the requester for a third key is not received within a predetermined period of time and in response to determining any remaining keys in the allocated subset pool:

adding the remaining keys to the recycled key pool; and releasing the allocated subset pool.

7. The method of claim 1, wherein the method is performed by a first module on a same or a different device as the requester, wherein the requester is a first requester, wherein the first module communicates with a second module on a second device, wherein the second module communicates with a second requester on a same or a different device as the second module, wherein a requester is an application, wherein the general pool is a first general pool maintained by the first module, wherein the allocated subset pool is a first allocated subset pool maintained by the first module, wherein a second general pool is maintained by the second module, wherein a second allocated subset pool is maintained by the second module, and wherein the method further comprises:

generating, by the first module, a synchronization message for the second module;

receiving, by the first module, an acknowledgment of the synchronization message from the second module.

8. The method of claim 7, further comprising transmitting, by the first requester to the second requester, a notification message which indicates parameters associated with the synchronization message, which causes the second requester to:

transmit to the second module a second request for a third key, wherein the second request is based on the parameters indicated in the notification message; and receive a fourth key with a length matching the requested length, wherein the fourth key is obtained from the second allocated subset pool.

9. The method of claim 8, wherein the synchronization message indicates for the second module to perform one or more of:

allocating the second subset pool to the second requester, wherein the second allocated subset pool includes keys which are the same as the keys in the first allocated subset pool;

obtaining from the second allocated subset pool the fourth key;

applying from the second general pool for a fifth key with a length greater than or equal to the requested length;

in response to identifying the fourth key in a recycled key pool of the second module, obtaining the fourth key from the recycled key pool;

in response to not identifying the fourth key in the recycled key pool, applying from the second general pool for the fourth key;

releasing the second allocated subset pool;

adding any remaining keys from the second allocated subset pool to the recycled key pool; and performing any method performed by the first module to provide a synchronization between the first module and the second module of the first general pool and the second general pool, the first allocated subset pool and the second allocated subset pool, and the obtained second key and the obtained fourth key.

10. A computer system for facilitating quantum key distribution, the system comprising:

a processor; and a memory coupled to the processor and storing instructions, which when executed by the processor cause the processor to perform a method, the method comprising:

receiving, from a requester, a first request for a first key, wherein the first request indicates a requested length for the first key and identifying information of the requester;

in response to determining that a subset pool of a general pool of keys has been previously allocated to the requester based on the identifying information of the requester, wherein the keys in the general pool are generated by a quantum engine, and wherein the allocated subset pool is dedicated to the requester and is a pool of keys which includes a subset of keys in the general pool of keys:

obtaining from the previously allocated subset pool a second key with a length matching the requested length; and returning, as the requested first key, the obtained second key to the requester; and in response to determining that a subset pool has not been previously allocated to the requester:

allocating a new subset pool to the requester, wherein the newly allocated subset pool is dedicated to the requester and is a pool of keys which includes a subset of keys in the general pool of keys;

establishing a correspondence between the identifying information of the requester and the newly allocated subset pool;

obtaining from the newly allocated subset pool a second key with a length matching the requested length; and returning, as the requested first key, the obtained second key to the requester.

11. The computer system of claim 10, wherein in response to determining that a subset pool has been previously allocated to the requester based on the identifying information of the requester, the method further comprises:

in response to determining that the second key does not exist in the previously allocated subset pool:

applying from the general pool for a third key with a length greater than or equal to the requested length; obtaining the third key; and adding the third key to the previously allocated subset pool of the requester.

12. The computer system of claim 10, wherein allocating the new subset pool to the requester further comprises:

creating a plurality of subset pools as part of an initialization process; and selecting the new subset pool from the plurality of subset pools.

13. The computer system of claim 10, wherein allocating the new subset pool to the requester further comprises:

applying from the general pool for a third key of the requested length or of a pre-determined length, wherein the requested length is less than or equal to the predetermined length;

obtaining the third key; and constructing the new subset pool using the third key.

14. The computer system of claim 10, wherein allocating the new subset pool to the requester further comprises applying for the second key, which involves:

in response to identifying the second key in a recycled key pool, obtaining the second key from the recycled key pool;

in response to not identifying the second key in the recycled key pool, applying from the general pool for the second key; and in response to not obtaining the second key from the general pool, returning a failure message to the requester.

15. The computer system of claim 10, further comprising:

in response to receiving a message from the requester to terminate a TCP connection and in response to determining any remaining keys in the allocated subset pool:

adding the remaining keys to a recycled key pool; and releasing the allocated subset pool; and in response to determining that a second request from the requester for a third key is not received within a predetermined period of time and in response to determining any remaining keys in the allocated subset pool:

adding the remaining keys to the recycled key pool; and releasing the allocated subset pool.

16. The computer system of claim 10, wherein the method is performed by a first module on a same or a different device as the requester, wherein the requester is a first requester, wherein the first module communicates with a second module on a second device, wherein the second module communicates with a second requester on a same or a different device as the second module, wherein a requester is an application, wherein the general pool is a first general pool maintained by the first module, wherein the allocated subset pool is a first allocated subset pool maintained by the first module, wherein a second general pool is maintained by the second module, wherein a second allocated subset pool is maintained by the second module, and wherein the method further comprises:

generating, by the first module, a synchronization message for the second module;

receiving, by the first module, an acknowledgment of the synchronization message from the second module.

17. The computer system of claim 16, further comprising transmitting, by the first requester to the second requester, a notification message which indicates parameters associated with the synchronization message, which causes the second requester to:

transmit to the second module a second request for a third key, wherein the second request is based on the parameters indicated in the notification message; and receive a fourth key with a length matching the requested length, wherein the fourth key is obtained from the second allocated subset pool.

18. The computer system of claim 17, wherein the synchronization message indicates for the second module to perform one or more of:

allocating the second subset pool to the second requester, wherein the second allocated subset pool includes keys which are the same as the keys in the first allocated subset pool;
obtaining from the second allocated subset pool the fourth key;
applying from the second general pool for a fifth key with a length greater than or equal to the requested length;
in response to identifying the fourth key in a recycled key pool of the second module, obtaining the fourth key from the recycled key pool;
in response to not identifying the fourth key in the recycled key pool, applying from the second general pool for the fourth key;
releasing the second allocated subset pool;
adding any remaining keys from the second allocated subset pool to the recycled key pool; and
performing any method performed by the first module to provide a synchronization between the first module and the second module of the first general pool and the second general pool, the first allocated subset pool and the second allocated subset pool, and the obtained second key and the obtained fourth key.

19. A non-transitory computer-readable storage medium storing instructions that when executed by a computer cause the computer to perform a method, the method comprising:
receiving, from a requester, a first request for a first key, wherein the first request indicates a requested length for the first key and identifying information of the requester;
in response to determining that a subset pool of a general pool of keys has been previously allocated to the requester based on the identifying information of the requester, wherein the keys in the general pool are generated by a quantum engine, and wherein the allocated subset pool is dedicated to the requester and is a pool of keys which includes a subset of keys in the general pool of keys:
obtaining from the previously allocated subset pool a second key with a length matching the requested length; and
returning, as the requested first key, the obtained second key to the requester; and
in response to determining that a subset pool has not been previously allocated to the requester:
allocating a new subset pool to the requester, wherein the newly allocated subset pool is dedicated to the requester and is a pool of keys which includes a subset of keys in the general pool of keys;
establishing a correspondence between the identifying information of the requester and the newly allocated subset pool;
obtaining from the newly allocated subset pool a second key with a length matching the requested length; and
returning, as the requested first key, the obtained second key to the requester.

20. The storage medium of claim 19, wherein the method further comprises:
maintaining the general pool;
handling applications to the general pool for key requests;
maintaining a recycled pool;
handling applications to the recycled pool for key requests; and
performing synchronization operations.

* * * * *